(12) United States Patent
Wang et al.

(10) Patent No.: US 9,600,668 B2
(45) Date of Patent: Mar. 21, 2017

(54) METHOD AND DEVICE FOR EXTRACTING CHARACTERISTIC CODE OF APK VIRUS

(71) Applicant: BEIJING QIHOO TECHNOLOGY COMPANY LIMITED, Beijing (CN)

(72) Inventors: Xun Wang, Beijing (CN); Xu Zhang, Beijing (CN)

(73) Assignee: BEIJING QIHOO TECHNOLOGY COMPANY LIMITED, Beijing (CN)

( * ) Notice: Subject to any disclaimer, the term of this patent is extended or adjusted under 35 U.S.C. 154(b) by 56 days.

(21) Appl. No.: 14/386,567

(22) PCT Filed: Mar. 12, 2013

(86) PCT No.: PCT/CN2013/072480
§ 371 (c)(1),
(2) Date: Sep. 19, 2014

(87) PCT Pub. No.: WO2013/139216
PCT Pub. Date: Sep. 26, 2013

(65) Prior Publication Data
US 2015/0052611 A1    Feb. 19, 2015

(30) Foreign Application Priority Data

Mar. 21, 2012 (CN) .......................... 2012 1 0076721

(51) Int. Cl.
*G06F 11/00* (2006.01)
*G06F 12/14* (2006.01)
(Continued)

(52) U.S. Cl.
CPC .......... *G06F 21/561* (2013.01); *G06F 21/563* (2013.01); *G06F 21/56* (2013.01);
(Continued)

(58) Field of Classification Search
CPC ...... G06F 21/56; G06F 21/561; G06F 21/562; G06F 21/563; G06F 21/564; G06F 21/565; H04L 63/1416
See application file for complete search history.

(56) References Cited

U.S. PATENT DOCUMENTS 8,756,432 B1 * 6/2014 Chen ...................... G06F 21/51
713/187
8,844,036 B2 * 9/2014 Saidi ................... G06F 21/6218
726/1

(Continued)

OTHER PUBLICATIONS

"Automated Static Code Analysis for Classifying Android Applications Using Machine Learning", Shabtai et al., 2010 International Conference on Computational Intelligence and Security, 2010.*

(Continued)

*Primary Examiner* — Jayesh Jhaveri
(74) *Attorney, Agent, or Firm* — James M. Stipek; John R. Bednarz; Polsinelli PC

(57) ABSTRACT

Disclosed are a method and a device for extracting a characteristic code of an APK virus. The method comprises: scanning a designated file in an Android installation package APK; extracting an operation instruction in the designated file, and judging whether the operation instruction contains virus information; and if yes, generating a characteristic code of the virus according to the operation instruction. In the application, the characteristic code of the virus APK can be accurately and effectively extracted, so as to facilitate improvement of efficiency and accuracy of identification of the virus APK and a variation thereof, thereby improving the security of an APK application.

15 Claims, 4 Drawing Sheets

(51) Int. Cl.
*G08B 23/00* (2006.01)
*G06F 21/56* (2013.01)
*H04L 29/06* (2006.01)

(52) U.S. Cl.
CPC .......... *G06F 21/562* (2013.01); *G06F 21/564* (2013.01); *G06F 21/565* (2013.01); *H04L 63/1416* (2013.01)

(56) References Cited

U.S. PATENT DOCUMENTS

| | | | | |
|---|---|---|---|---|
| 2006/0015747 | A1* | 1/2006 | Van de Ven | H04L 63/145 713/188 |
| 2011/0145920 | A1* | 6/2011 | Mahaffey | G06F 21/564 726/22 |
| 2011/0225417 | A1* | 9/2011 | Maharajh | G06F 21/10 713/150 |
| 2012/0110174 | A1* | 5/2012 | Wootton | G06F 21/564 709/224 |
| 2012/0233612 | A1* | 9/2012 | Beckett | G06F 9/45533 718/1 |
| 2012/0324568 | A1* | 12/2012 | Wyatt | G06F 21/51 726/13 |
| 2013/0067577 | A1* | 3/2013 | Turbin | G06F 21/562 726/24 |
| 2013/0097706 | A1* | 4/2013 | Titonis | G06F 21/56 726/24 |
| 2013/0117854 | A1* | 5/2013 | Britton | G06F 21/56 726/24 |
| 2013/0318607 | A1* | 11/2013 | Reed | G06F 11/3062 726/23 |

OTHER PUBLICATIONS

"An Android Application Sandbox System for Suspicious Software Detection", Biasing et al., 2010 5th International Conference on Malicious and Unwanted Software, 2010.*
"Analysis on maliciousness for mobile applications", Seo et al., 2012 Sixth International Conference on Innovative Mobile and Internet Services in Ubiquitous Computing, 2012.*
International Search Report regarding Chinese International Application No. PCT/CN2013/072480 issued Jun. 13, 2013, 4 pages.
English translation of abstract only of Chinese application CN1567118A, Publication date: Jan. 19, 2005, Country: CN, Inventors: Li Tao, et al., one page.
English translation of abstract only of Chinese application CN101079689A, Publication date: Nov. 28, 2007, Country: CN, Inventors: Lei Wang, et al., one page.
English translation of abstract only of Chinese application CN102254113A, Publication date: Nov. 23, 2011, Country: CN, Inventors: Zihang Xiao, et al., one page.

* cited by examiner

METHOD AND DEVICE FOR EXTRACTING CHARACTERISTIC CODE OF APK VIRUS

FIELD OF THE INVENTION

The present invention relates to the technical field of computer security, and particularly to a method for extracting a characteristic code of APK virus and a device for extracting a characteristic code of APK virus.

BACKGROUND OF THE INVENTION

Android is an open source code operating system based on Linux and mainly used for mobile terminals such as mobile phones, and does not have a uniform Chinese equivalent term to date. An Android platform consists of an operating system, middleware, a user interface and application software.

APK is an abbreviation of Android application package file, namely, Android installation package, and it may also be understood as application software installed on the Android terminal. APK is in a file format similar to Symbian Sis or Sisx. The APK file may be installed by being directly delivered to an Android simulator or Android terminal and executed. Like sis, the apk file packages an android sdk compiling project into an installation program file in an apk format. The APK file is in fact in a zip format with an extension name being modified to apk, and it is decompressed by UnZip to get a Dex file. Dex represents Dalvik VM executes, namely, an Android Dalvik execution program, not a standard Java byte code but a Dalvik byte code. Upon running a program, Android first needs to decompress by using UnZip and then directly run it like Symbian, different from a PE file in Windows Mobile.

Specifically, the structure of the APK file is shown in the following table:

| | |
|---|---|
| META-INF\ | Store files CERT.RSA, CERT.SF, and MANIFEST.MF |
| res\ | Store an APK-related source file |
| AndroidManifest.xml | APK global configuration file |
| classes.dex | Dalvik Executable (Dalvik virtual machine executable file) |
| resources.arsc | Binary resource file after compilation |

Upon specific application, APK may be imported into a mobile terminal via a data line, or directly downloaded and installed through a market (tool software such as Android market) or webpage. As Android terminals get popularized and developed, various APK come into being and include virus APK, for example, some APK do harm to a user's rights and interests by malicious behaviors such as short message customization payment service, dialing charged telephone or backing up sensitive data in the user's mobile phone to a specific server.

Currently, there already occur some mobile terminal-specific security software (e.g., mobile phone antivirus software) for checking and killing these viruses APK. Methods for checking and killing the virus APK by these current security softwares mainly include the following two kinds:

The first kind is identifying the virus APK by means of HASH, signature, package name of the APK file on the principle of extracting a KEY for APK by using HASH algorithm, and then identifying virus APK according to the KEY, or identifying it through the virus APK maker's APK digital signature and package name.

However, the above current manner of identifying based on HASH of the APK file probably, by re-confusing or adding a new source file to the APK file or even modifying the code, causes the KEY extracted through HASH algorithm to change and thereby causes failure to identify; the above current signature-based identifying manner may be evaded by changing the signature; the above current package name-based identifying manner may be evaded by changing the package name. Furthermore, it is very easy for virus maker to change the confusion manner, modify APK file (adding or deleting resource, code or the like) or change the signature. Hence, the virus maker can very easily make a new virus variation and thereby evade the identification of the security software.

The second kind is identifying the virus APK through a class name in classes.dex in the APK file on the principle of identifying by analyzing classes in the classes.dex and then extracting names of several classes as virus characteristic codes, and then parsing the classes.dex file in the virus APK to see whether it contains specific class names.

However, this identifying manner by scanning class names might cause mis-reporting as only checking class names on the one hand, and on the other hand, it is very easily evaded by the virus maker by confusing or directly modifying the class name.

Hence, a technical problem to be solved by those skilled in the art currently is to provide a mechanism for extracting virus APK characteristic code to accurately and effectively extract virus APK characteristic codes to improve the efficiency and accuracy of identifying the virus APK and its variations, thereby improving the security of APK application.

SUMMARY OF THE INVENTION

In view of the above problems, the present invention is proposed to provide a method and device for extracting a characteristic code of APK virus, which can overcome the above problems or at least partially solve or ease the above problems.

According to an aspect of the present invention, there is provided a method for extracting a characteristic code of APK virus, comprising: scanning a designated file in an Android installation package APK; extracting an operation instruction in the designated file, and judging whether the operation instruction contains virus information; and if yes, generating a characteristic code of the virus according to the operation instruction.

According to another aspect of the present invention, there is provided a device for extracting a characteristic code of APK virus, comprising: a scanning module configured to scan a designated file in an Android installation package APK; an instruction extracting module configured to extract an operation instruction in the designated file; an instruction judging module configured to judge whether the operation instruction contains virus information; and a first characteristic code generating module configured to generate a characteristic code of the virus according to the operation instruction if the operation instruction contains the virus information.

According to a further aspect of the present invention, there is provided a computer program which comprises a computer readable code; when the computer readable code is run on a server, the server executes the method for extracting the characteristic code of APK virus according to any one of claims 1-11.

According to a further aspect of the present invention, there is provided a computer readable medium which stores the computer program.

Advantageous effects of the present invention are as follows:

In the present invention, a designated file such as an executable file or a text file in an APK file is scanned and analyzed, corresponding virus characteristic codes are generated with respect to instructions, constants or header information which containing virus information according to predetermined rules, and compiled into a virus characteristic code library for use in subsequent APK virus identification, thereby accurately and effectively extracting virus APK characteristic codes to improve the efficiency and accuracy of identifying the virus APK and its variations, and improving the security of APK application.

The above description only generalizes technical solutions of the present invention. The present invention may be implemented according to the content of the description in order to make technical means of the present invention more apparent. Specific embodiments of the present invention are exemplified to make the above and other objects, features and advantages of the present invention more apparent.

BRIEF DESCRIPTION OF THE DRAWINGS

Various other advantages and merits will become apparent to those having ordinary skill in the art by reading through the following detailed description of preferred embodiments. Figures are only intended to illustrate preferred embodiments and not construed as limiting the present invention. In all figures, the same reference number denotes the same part. In the figures.

DETAILED DESCRIPTION OF THE INVENTION

The present invention will be further described below with reference to figures and specific embodiments.

One of core ideas of embodiments of the present application is as follows: scanning and analyzing a designated file such as an executable file or a text file in an APK file, generating corresponding virus characteristic codes with respect to instructions, constants or header information containing virus information according to predetermined rules, and compiling into a virus characteristic code library for use in subsequent APK virus identification.

Figure 1:
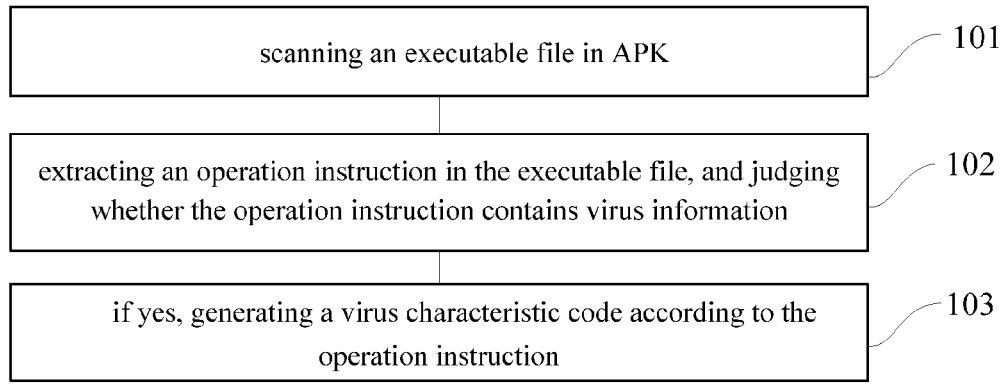
FIG. 1 illustrates a flow chart of a method for extracting a characteristic code of APK virus according to Embodiment 1 of the present invention.

Referring to FIG. 1, it illustrates a flow chart of a method for extracting a characteristic code of APK virus according to Embodiment 1 of the present invention. It may specifically comprise the following steps:

Step 101: scanning an executable file in APK

In a preferred embodiment of the present invention, the executable file comprises a Dex file which is mainly classes.dex file, namely, Dalvik Executable (Dalvik virtual machine executable file) in APK. As well known, Dalvik is a Java virtual machine for use in an Android platform. The Dalvik virtual machine (Dalvik VM) is one of kernel integral parts of an Android mobile apparatus platform. It may support the running of Java application program already converted into .dex (namely Dalvik Executable) format. The .dex format is a compression format purposefully designed for Dalvik and is adapted for a system with limited memory and processor speed. After optimization, Dalvik permits an example of simultaneously running a plurality of virtual machines in the limited memory, and each Dalvik application is executed as an independent Linux process. The independent process may prevent all programs from being closed when the virtual machines fail.

More preferably, the executable file may include a file with an extension name .jar. The JAR file in the Android installation package is in fact a Dex file, and the only thing is that its extension name is .jar. Regarding other files in the APK other than classes.dex, whether to scan may be decided so long as they are judged as Dex files.

In practical application, the Dex file may further include other files in Dex format.

Step 102: extracting an operation instruction in the executable file, and judging whether the operation instruction contains virus information;

In specific implementation, the operation instruction comprises opcode and operand. In this case, whether the operation instruction includes virus information may be judged by the following substeps:

Substep S11: judging whether the operand includes a pre-defined illegal operand;

and/or substep S12: judging whether the combination of the opcode and operand complies with a predefined illegal combination rule.

Step 103: if yes, generating a characteristic code of the virus according to the operation instruction.

In a preferred embodiment of the present invention, step 103 may comprise the following substeps:

Substep S21: regarding the operation instruction itself as the virus characteristic code; and/or Substep S22: regarding the opcode of the operation instruction and a character string or wildcard of the operand as the virus characteristic code.

In an implementation, the virus characteristic codes may comprise an operand characteristic code, an instruction characteristic code and an instruction characteristic code sequence.

For example, instructions (operation instructions) in the classes.dex file of a certain APK are listed as follows:

| | |
|---|---|
| 1a0c bb08 | \|009b: const-string v12, "tiger" // string@08bb |
| 1a0d 1e03 | \|009d: const-string v13, "P5" // string@031e |
| 7120 1404 dc00 | \|009f: invoke-static {v12, v13}, |
| Lcom/androidkernel/flash/util/LogUtil;.i:(Ljava/lang/String;Ljava/lang/String;)V // method@0414 | |
| 2205 9700 | \|00a2: new-instance v5, |
| Lcom/androidkernel/flash/http/base/DlStruct; // type@0097 | |
| 7010 1603 0500 | \|00a4: invoke-direct {v5}, |
| Lcom/androidkernel/flash/http/base/DlStruct;.<init>:( )V // method@0316 | |
| 1a0c 7200 | \|00a7: const-string v12, "AA" // string@0072 |
| 7020 f402 ce00 | \|00a9: invoke-direct (v14, v12}, |
| Lcom/androidkernel/flash/helper/Tiger;.getUrl:(Ljava/lang/String;)Ljava/lang/String; // method@02f4 | |
| 0c0b | \|00ac: move-result-object v11 |

When judging the combination of the above opcode and operand complies with a predefined illegal combination rule, or upon judging the above operand includes a pre-defined illegal operand, the following manners are employed to generate the characteristic code:

Manner 1:
1a0cbb081a0d1e0371201404dc0022059700701016030500 1a0c720070 20f402ce000c0b Manner 2:
1a$tiger$1a$P5$71$Lcom/androidkernel/flash/util/LogUtil;.i:(Ljava/la ng/String;Ljava/lang/String;)V$22$Lcom/androidkernel/flash/http/base/DlStruct;$70$ Lcom/androidkernel/flash/http/base/DlStruct;.<init>:( )V$1a$AA$70$Lcom/androidke rnel/flash/helper/Tiger;.getUrl:(Ljava/lang/String;)Ljava/lang/String;$0c$*

Manner 3:
1a0cbb08$1a$P5$71201404dc00$22$*$70$Lcom/androidkernel/flash/ http/base/DlStruct;.<init>:( )V$1a$AA$70$Lcom/androidkernel/flash/helper/Tiger;.ge tUrl:(Ljava/lang/String;)Ljava/lang/String;$0c$*

Figure 2:
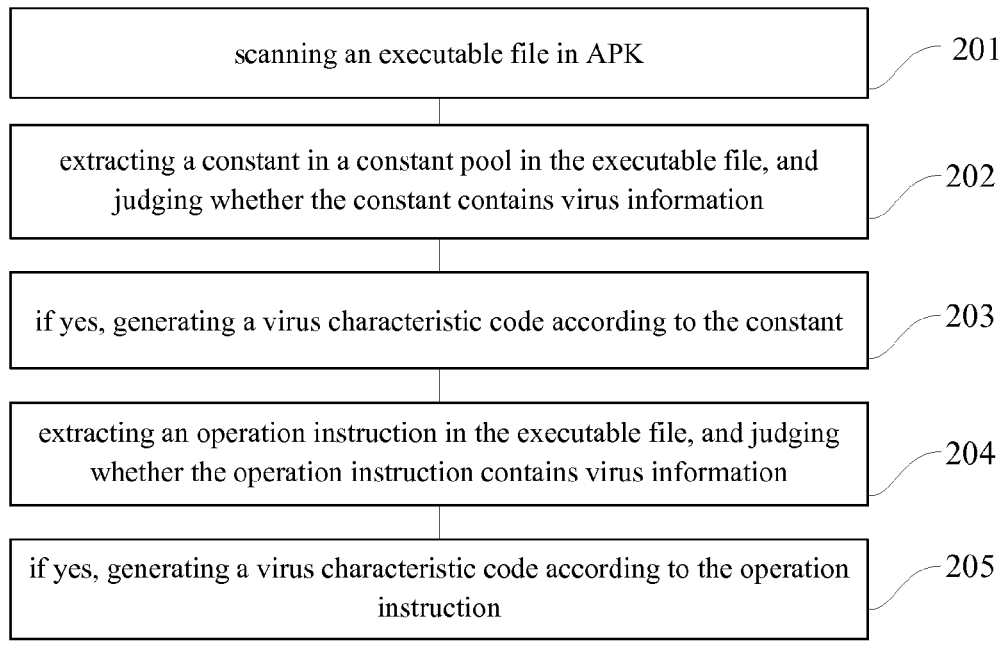
FIG. 2 illustrates a flow chart of a method for extracting a characteristic code of APK virus according to Embodiment 2 of the present invention.

Referring to FIG. 2, it illustrates a flow chart of a method for extracting a characteristic code of APK virus according to Embodiment 2 of the present invention, specifically comprising the following steps:

Step 201: scanning an executable file in APK;

Step 202: extracting a constant in a constant pool in the executable file, and judging whether the constant contains virus information;

In a preferred embodiment of the present application, the constants in the constant pool in the designated file may include constants in character strings, types, fields and methods. Whether the constants contain virus information may be judged by the following substeps:

Substep S31: judging whether constants in the character strings contain malicious information such as pre-defined malicious web address information, malicious file names or malicious number information;

and/or,

Substep S32: judging whether constants in the types, fields an methods invoke self-defined class names, self-defined function names, Android system SDK class names, and Android system function names.

Step 203: if yes, generating a characteristic code of the virus according to the constant.

Upon specific application, the virus information in the constants may be regarded as virus characteristic codes.

In the present embodiment, the virus characteristic codes further include constant characteristic codes, and class name function name characteristic codes.

For example, the constant pool in the classes.dex file of a certain APK includes the following character string:
com.noshufou.android.su
/system/app/com.google.update.apk After it is judged as virus information, it may be directly regarded as a virus characteristic code.

For example, the constant pool in the classes.dex file of a certain APK includes the following method:
Lcom/android/main/SmsReceiver;
Lcom/android/main/ActionReceiver;

After it is judged as virus information, it may be directly regarded as a virus characteristic code.

For example, the constant pool in the classes.dex file of a certain APK includes the following type:

Lcom/androidkernel/flash/Main$1;

After it is judged as virus information, it may be directly regarded as a virus characteristic code.

For example, the constant pool in the classes.dex file of a certain APK includes the following field:

Lcom/androidkernel/flash/b/br$1;.this$0:Lcom/androidkernel/flash/b/br ;

After it is judged as virus information, it may be directly regarded as a virus characteristic code.

Step 204: extracting an operation instruction in the executable file, and judging whether the operation instruction contains virus information;

Step 205: if yes, generating a characteristic code of the virus according to the operation instruction.

Dalvik VM is designed based on a register. Data such as strings, types, fields and methods used in the program are stored in a dedicated data storage area (constant pool), and they are cited by corresponding index in the program. The character literal constant is directly stored in instructions (operation instructions) and its operating codes (opcode) are classified into two types:

One type is placing designated data in the register, e.g., as shown in Example 1 through Example 4 below:

Example 1

| 1303 6100 | \|0000: const/16 v3, #int 97 // #61 | wherein an integer 97 is placed in a register v3.

Example 2

| 1700 0000 0040 | \|0049: const-wide/32 v0, #float 2.000000 // |

Wherein a floating point number 2.000000 is placed in a register v0.

Example 3

| 1a00 7d00 string@007d | \|000b: const-string v0, "%.2fMB" // |

Wherein a string "%.2fMB" is placed in the register v0.

Example 4

| 1c03 6e04  \|0015: const-class v3, |
| Lcom/qihoo360/mobilesafe/service/NetTrafficService; // type@046e |

Wherein a class, com.qihoo360.mobilesafe.service.NetTrafficService, is placed in the register v3.

The other type is performing operation based on the register, e.g., as shown in the following Example 5 through Example 10:

Example 5

| 3100 0305 | \|0042: cmp-long v0, v3, v5 |

Wherein long values in the registers v3 and v5 are compared and a comparison result is stored in the register v0.

Example 6

| 3221 0400 | \|001a: if-eq v1, v2, 001e // +0004 | if shows a condition that, execution of the flow is decided according to whether v1 is equal to v2.

Example 7

| 3800 1500 | \|001e: if-eqz v0, 0033 // +0015 | if shows a condition that, execution of the flow is decided by judging whether v0 is equal to 0.

Example 8

| 6e10  0e29  0500 | \|0006: invoke-virtual {v5}, |
| Ljava/io/File;.length:( )J // method@290e |

Wherein length( ) function of File is invoked.

Example 9

| 7010 042a 0800 | \|011d: invoke-direct {v8}, |
| Ljava/lang/StringBuilder;.<init>:( )V // method@2a04 |

Wherein init function in StringBuilder is invoked.

Example 10

| b021 | \|0035: add-int/2addr v1, v2 | wherein the result of v1+v2 is stored in v1.

User class name, function name and string in the classes.dex file in the APK vary with confusion or modification, but instructions of Dalvik VM and invocation of the class provide by Android system SDK are not affected by confusion or modification of the user class name, function name and variable name. Accordingly, the APK may be identified through a group of sequential specific instructions. Dalvik VM is based on the register, its instructions per se can only operate the register, character literal constant and data storage area while an address of the register is invariable, hence, fuzzy matching is required upon identification, namely, by identifying a fixed portion, namely, opcode in the instruction and its related character literal constant parameters or strings, types, fields and methods in the data storage area. Certainly, the instructions and its operands themselves may be directly regarded as the virus characteristic codes.

The first solution for generating the characteristic code:

A specific instruction set itself in the classes.dex in the APK is directly used as the virus characteristic code.

For example, the virus characteristic code of the above Example 1 may be 1303 6100, the virus characteristic code of Example 2 may be 1700 0000 0040, the virus characteristic code of Example 3 may be 1a00 7d00, the virus characteristic code of Example 4 may be 1c03 6e04, the virus characteristic code of Example 5 may be 3100 0305, the virus characteristic code of Example 6 may be 3221 0400, the virus characteristic code of Example 7 may be 3800 1500, the virus characteristic code of Example 8 may be 6e10 0e29 0500, the virus characteristic code of Example 9 may be 7010 042a 0800, and the virus characteristic code of Example 10 may be b021.

The second solution for generating the characteristic code:

A specific opcode in the classes.dex in the APK and a character string or wildcard of its operand are used as the virus characteristic code.

For example, the virus characteristic code in the above Example 1 may be 135$* (wherein * represents fuzzy matching, the same hereunder; noticeably "*" here is only used for exemplary purpose and any character may be used in practice), the virus characteristic code in Example 2 may be 17$*, the virus characteristic code of Example 3 may be 1a$, the virus characteristic code of Example 4 may be 1c$ Lcom/qihoo360/mobilesafe/service/NetTrafficService, the virus characteristic code of Example 5 may be 31$*, the virus characteristic code of Example 6 may be 32$*, the virus characteristic code of Example 7 may be 38$*, the virus characteristic code of Example 8 may be 6e$Ljava/io/File;.length:( ), the virus characteristic code of Example 9 may be 70$Ljava/lang/StringBuilder;.<init>, and the virus characteristic code of Example 10 may be b0$*.

The third solution for generating the characteristic code:

The above solution 1 and solution 2 are used in mixture, that is, an instruction set itself in the classes.dex file in the APK, and a specific opcode in the classes.dex file in the APK and a character string or wildcard of its operand are all used as the virus characteristic codes.

A specific example is presented below to help those skilled in the art to better understand the present invention:

the virus characteristic code extracted with respect to the constant extracted in the constant pool (string, type, field and method) in the classes.dex is as follows: for example, the character string constant pool of a certain virus includes the following feature character string:

zjphonecall.txt and zjsms.txt. The two files include a malicious telephone number and a special service short message number, and they may be extracted as the virus characteristic codes.

The virus characteristic code extracted for disassembling classes.dex is as follows:

For example, a virus X-undercover.apk contains the following instructions to back up the user's private data to http://www.mybackup.me, as listed below according to the sequential order of occurrence thereof:

```
2200 f600     |0000: new-instance v0, Ljaya/lang/StringBuilder;
// type@00f6
```

Its virus characteristic code is extracted as:

```
2200f600 or 22$Ljava/lang/StringBuilder
7010 9804 0000     |0002: invoke-direct {v0},
Ljava/lang/StringBuilder;.<init>:( )V // method@0498
```

Its virus characteristic code is extracted as:

```
70109804000 or 70$Ljava/lang/StringBuilder;.<init>
1a01 5506     |0005: const-string v1, "http://www.mybackup.me" //
string@0655
```

Its virus characteristic code is extracted as:

```
701098040000 or 1a$http://www.mybackup.me
6e20 9e04 1000          |0007: invoke-virtual {v0, v1},
Ljava/lang/StringBuilder;.append:(Ljava/lang/String;)Ljava/lang/
StringBuilder; //
method@049e
```

Its virus characteristic code is extracted as:

```
6e209e041000 or 6e$Ljava/lang/StringBuilder;.append
3902 0900               |0005: if-nez v2, 000e // +0009
```

Its virus characteristic code is extracted as:

```
39020900 or 39$*
0c02               |0003: move-result-object v2
```

Its virus characteristic code is extracted as:
0c02 or 0c$*

The finally obtained virus characteristic code is:

The first solution for selecting the virus characteristic code:
2200f6007010980400007010980400006e209e041000390209000c02

The second solution for selecting the virus characteristic code:
22$Ljava/lang/StringBuilder$70$Ljava/lang/StringBuilder;.<init>$1a$ http://www.mybackup.me$6e$Ljava/lang/StringBuilder;.append$39$*$0c$*

The third solution for selecting the virus characteristic code:
22$Ljava/lang/StringBuilder$701098040000$1a$http://www.mybacku p.me$6e$Ljava/lang/StringBuilder;.append$39$*$0c02

Figure 3:
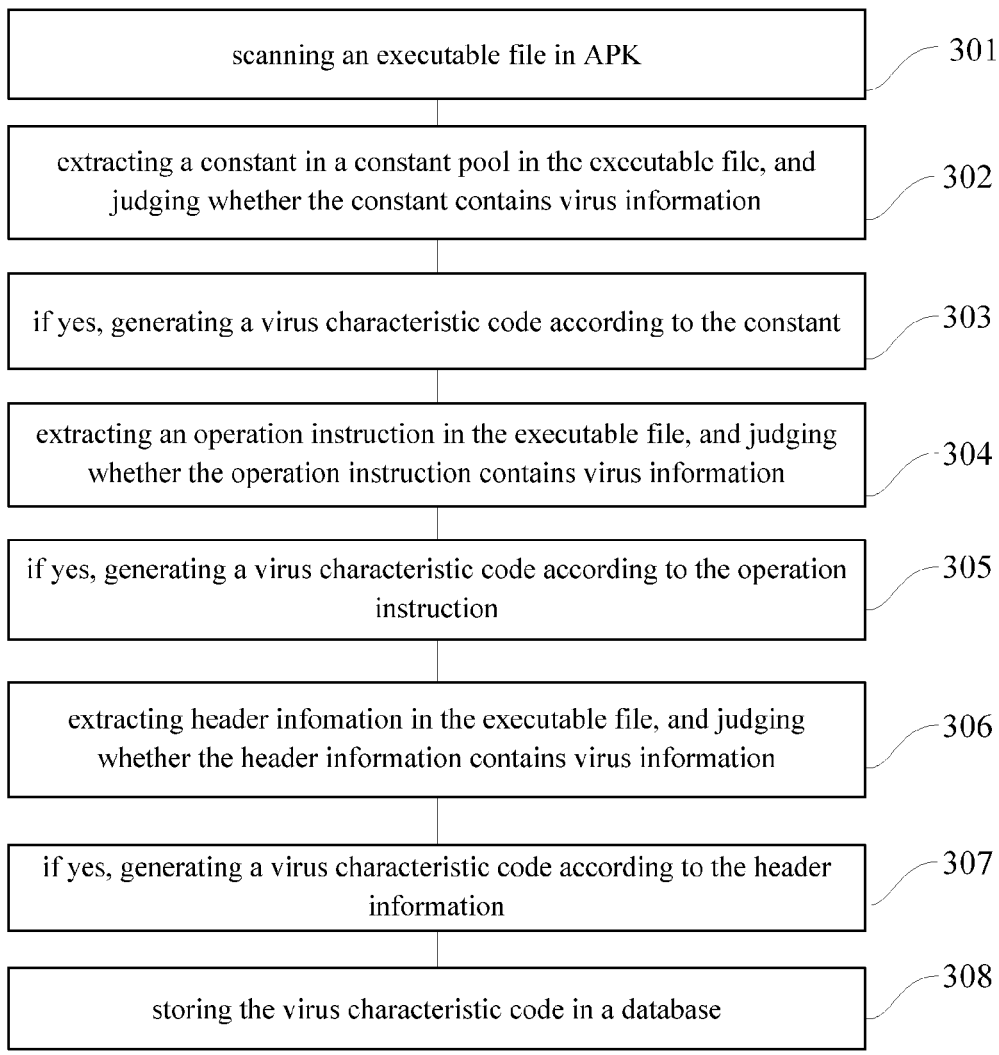
FIG. 3 illustrates a flow chart of a method for extracting a characteristic code of APK virus according to Embodiment 3 of the present invention.

Referring to FIG. 3, it illustrates a flow chart of a method for extracting a characteristic code of APK virus according to Embodiment 3 of the present invention, specifically comprising the following steps:

Step 301: scanning an executable file in APK;

Step 302: extracting a constant in a constant pool in the executable file, and judging whether the constant contains virus information;

Step 303: if yes, generating a virus characteristic code according to the constant.

Step 304: extracting an operation instruction in the executable file, and judging whether the operation instruction contains virus information;

Step 305: if yes, generating a virus characteristic code according to the operation instruction.

User class name, function name and character string in the classes.dex file and JAR file in the APK vary with confusion or modification, but instructions of Dalvik VM and invocation of the class provide by Android system SDK are not affected by confusion or modification of the user class name, function name and variable name. Accordingly, the APK may be identified through a group of sequential specific instructions. Dalvik VM is based on the register, its instructions per se can only operate the register, character literal constant and data storage area, while an address of the register is invariable, hence, fuzzy matching is required upon identification, namely, by identifying a fixed portion, namely, opcode in the instruction and its related character literal constant parameters or strings, types, fields and methods in the data storage area. Certainly, the instructions and its operands themselves may be directly regarded as the virus characteristic codes.

The first solution for generating the virus characteristic code:
A specific instruction set itself in the classes.dex file and JAR file in the APK is directly used as the virus characteristic code.

The second solution for generating the virus characteristic code:

A specific opcode in the classes.dex file and JAR file in the APK and a character string or wildcard of its operand are used as the virus characteristic code.

The third solution for generating the characteristic code:

The above solution 1 and solution 2 are used in mixture, that is, an instruction set itself in the classes.dex file and JAR file in the APK, and a specific opcode in the classes.dex file and JAR file in the APK and a character string or wildcard of its operand are all used as the virus characteristic codes.

Step 306: extracting header information in the executable file, and judging whether the header information contains virus information;

In specific implementation, the header information of the executable file includes summary information checksum and/or signature information Signature. In this case, the step 306 may be:

judging whether the summary information checksum and signature information Signature include a pre-defined illegal character string.

Step 307: if yes, generating a virus characteristic code according to the header information.

In specific application, the summary information checksum and/or signature information Signature may be regarded as the virus characteristic code.

In the present embodiment, the virus characteristic code includes a header information characteristic code.

For example, the checksum of the header information header of the classes.dex file in the APK is: 11f26cac; and the Signature is 2911621AD071F675ADFOF590C3F1AFB5443BEBBE. When they are judged as Trojan virus, 11f26cac and 2911621AD071F675ADFOF590C3F1AFB5443BEBBE are directly extracted as virus characteristic codes.

Step 308: storing the virus characteristic code to a database.

In the embodiment of the present application, the virus characteristic code may comprise the header information characteristic code, constant characteristic code, operand characteristic code, instruction characteristic code, instruction characteristic code sequence, class name function name characteristic code. In this case, the header information characteristic code, constant characteristic code, operand characteristic code, instruction characteristic code, instruction characteristic code sequence, class name function name characteristic code may be respectively stored in different storage areas of the database; or the header information characteristic code, constant characteristic code, operand characteristic code, instruction characteristic code, instruction characteristic code sequence, class name function name characteristic code may be stored in the database, and are marked with a classification tag respectively.

Certainly, the above manners for storing the virus characteristic code are only exemplary. It is feasible for those skilled in the art to employ any storing manner according to actual situations. The present invention does not limit in this regard.

Those skilled in the art can easily understand that the above operation instruction, constant pool and header information are not limited in the scanning sequence. It is feasible for those skilled in the art to arbitrarily set the scanning sequence of the above three according to actual situations. The present invention does not limit this here.

In the above embodiment, the executable file in the APK file is scanned and analyzed, corresponding virus characteristic codes are generated with respect to instructions, constants or header information containing virus information, and compiled into a virus characteristic code library for use in subsequent APK virus identification, thereby accurately and effectively extracting virus APK characteristic codes to improve the efficiency and accuracy of identifying the virus APK and its variations, and improving the security of APK application.

Figure 4:
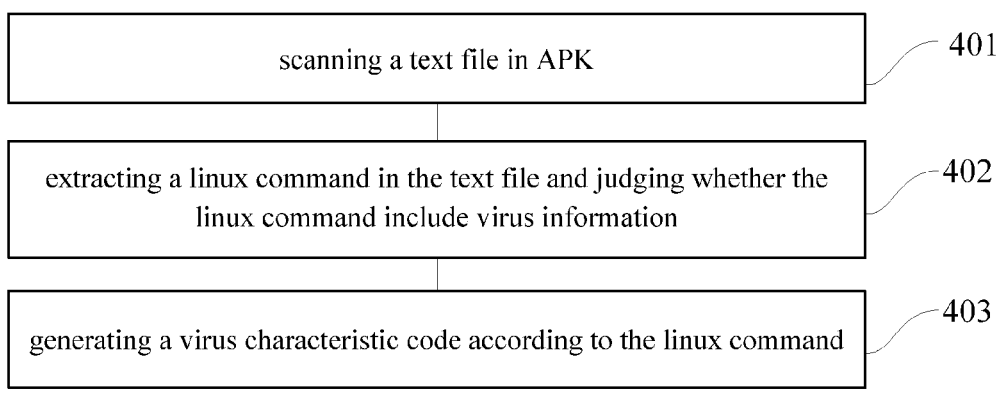
FIG. 4 illustrates a flow chart of a method for extracting a characteristic code of APK virus according to Embodiment 4 of the present invention.

Referring to FIG. 4, it illustrates a flow chart of a method for extracting a characteristic code of APK virus according to Embodiment 4 of the present invention, specifically comprising the following steps:

Step 401: scanning a text file in APK;

Step 402: extracting a linux command in the text file and judging whether the linux command include virus information;

In specific implementation, whether the linux command includes virus information by judging whether linux command complies with a preset malicious linux command.

Step 403: if yes, generating a virus characteristic code according to the linux command.

In specific implementation, the linux command including the virus information may be directly regarded as the virus characteristic code.

For example, a corresponding linux command is extracted from the text file in the APK as follows:

```
cat /system/bin/sh> /data/data/$1/files/sh.new
chown 0.0 /data/data/$1/files/sh.new
chmod 4755 /data/data/$1/files/sh.new
rm -f /data/data/$1/files/sh
mount -o remount system /system
mkdir /system/xbin/$1
myuid=$2
if [ "$myuid" == "" ]; then
myuid="0"
fi
chown ${myuid} /system/xbin/$1
chmod 700 /system/xbin/$1
cat /system/bin/sh> /system/xbin/$1/sh
chown 0.0 /system/xbin/$1/sh
chmod 4755 /system/xbin/$1/sh
sync
mount -o remount,ro system /system
#/system/bin/stop vold
#/system/bin/start vold
echo "+++ending+++"
```

When judging the linux command complies with a preset malicious linux command, the above command is written into the virus characteristic library as the virus characteristic code.

In the above embodiment, the text file in the APK file is scanned and analyzed, corresponding virus characteristic codes are generated with respect to the linux command containing virus information, and compiled into a virus characteristic code library for use in subsequent APK virus identification, thereby accurately and effectively extracting virus APK characteristic codes to improve the efficiency and accuracy of identifying the virus APK and its variations, and improving the security of APK application.

The embodiment of the present invention is further adapted for the situation that an APK is embedded in another APK, i.e., when an APK includes other APKs. Parsing and virus extraction are performed for executable files and text files in the APK and the embedded APK, for example, the embodiment of the present invention applies to a situation that a root.apk is embedded in a certain 1.APK to obtain a root right, and in this case, the virus characteristic code is extracted from 1.APK as well as from the root.apk. Those skilled in the art can readily envisage that the embodiment of the present invention also apply to a situation that APKs are embedded for many times. The present invention does not limit this here.

In specific implementation, embodiments of the present application may perform scanning for the text file and the executable file and perform extraction of the virus characteristic code, i.e., any combination of the above method embodiment 4, method embodiment 1, method embodiment 2 or method embodiment 3 is feasible. Embodiments of the present application are intended to focus on description of different application situations in different embodiments and do not limit the above combination of method embodiments.

Noticeably, embodiments of the present invention is not only adapted for various Android terminals, namely, terminals using Android platform (operating system), including computers, PC, notebook computer, mobile phone, flat panel computer and the like, but also adapted for virus characteristic code extracting solutions used on other computer systems (such as Windows or Linux).

Regarding the method embodiments, for sake of simple depiction, they are described as a series of combinations of actions. However, those skilled in the art should appreciate that the present invention is not limited to the order of the described actions because according to the present invention, some steps may be performed in other order or simultaneously. Secondly, those skilled in the art should appreciate that embodiments described in the description all belong to preferred embodiments and the involved actions and modules are not certainly requisite in the present invention.

Figure 5:
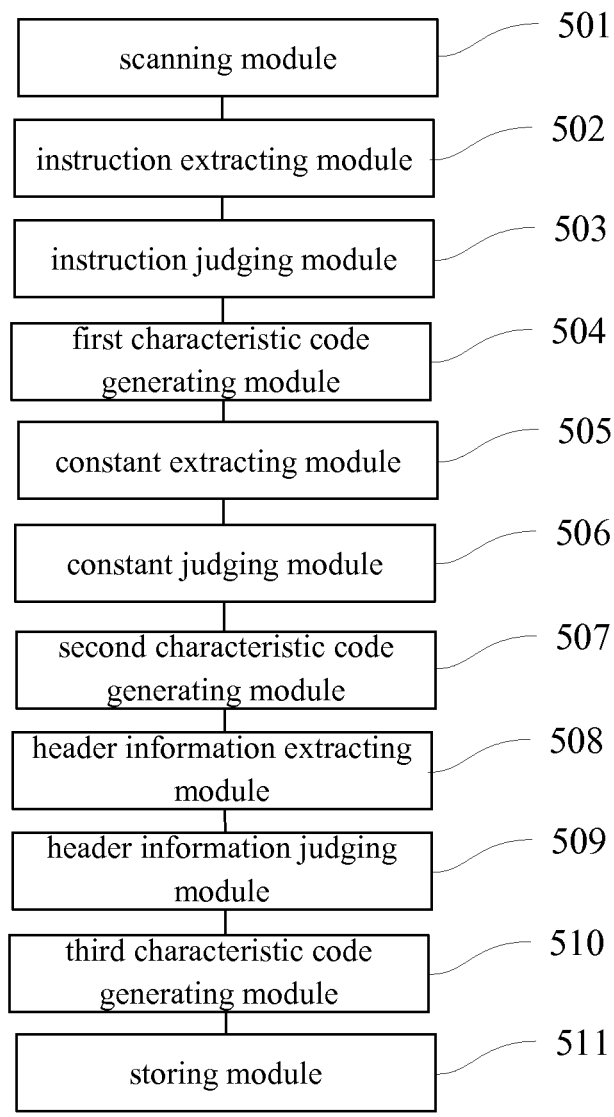
FIG. 5 illustrates a block diagram of a device for extracting a characteristic code of APK virus according to the present invention.

Referring to FIG. 5, it illustrates a block diagram of device for of extracting a characteristic code of APK virus according to an embodiment of the present invention, which may specifically comprise the following modules:

a scanning module 501 configured to scan a designated file in an Android installation package APK;

an instruction extracting module 502 configured to extract an operation instruction in the designated file;

an instruction judging module 503 configured to judge whether the operation instruction contains virus information; and a first characteristic code generating module 504 configured to generate a virus characteristic code according to the operation instruction if the operation instruction contains the virus information.

In specific implementation, the executable file may comprise a Dex file, the designated file comprises an executable file, the Dex file may comprise a classes.dex file, a file with an extension name .jar, and employ a file with other extension names or without an extension name but in Dex format.

A preferred embodiment of the present invention may further comprise the following modules:

a constant extracting module 505 configured to extract a constant in a constant pool of the executable file;

a constant judging module 506 configured to judge whether the constant includes virus information;

a second characteristic code generating module 507 configured to generate a virus characteristic code according to the constant if the constant contains the virus information.

A preferred embodiment of the present invention may further comprise the following modules:

a header information extracting module 508 configured to extract header information in the executable file;

a header information judging module 509 configured to judge whether the header information includes virus information;

a third characteristic code generating module 510 configured to generate a virus characteristic code according to the header information if the header information contains the virus information.

As an example of specific application of the embodiment of the present invention, the operation instruction comprises two portions: opcode and operand. In this case, the instruction judging module 403 may specifically include the following submodules:

a first judging submodule configured to judge whether the operand includes a pre-defined illegal operand;

and/or a second judging submodule configured to judge whether the combination of the opcode and operand complies with a predefined illegal combination rule.

In specific implementation, the first characteristic code generating module 404 may comprise the following submodules:

a direct generation submodule configured to regard the operation instruction itself as the virus characteristic code;

and/or a transformational generation submodule configured to regard the opcode of the operation instruction and a character string or wildcard of the operand as the virus characteristic code.

In specific implementation, constants in the constant pool in the executable file comprise constants in the character strings, types, fields and methods. In this case, the constant judging module 406 may comprise the following submodules:

a third judging module configured to judge whether constants in the character strings contain malicious information such as pre-defined malicious web address information, malicious file names or malicious number information;

and/or, a fourth judging submodule configured to judge whether constants in the types, fields an methods invoke a self-defined class name, a self-defined function name, an Android system SDK class name, or an Android system function name.

In specific application of the embodiment of the present application, the virus information in the constant, and the summary information checksum and/or signature information Signature are directly extracted as the virus characteristic codes.

In a preferred embodiment of the present invention, the designated file may further comprise a text file, and the operation instruction may be linux command. In this case, the instruction judging module 403 may comprise the following submodule:

a fifth judging submodule configured to judge whether the linux command complies with a preset malicious linux command.

To facilitate subsequent APK virus identification, the embodiment of the present invention may comprise the following module:

a storing module 511 configured to store the virus characteristic code to the database.

As an example of specific application of the embodiment of the present invention, the virus characteristic code may comprise: header information characteristic code, constant characteristic code, operand characteristic code, instruction characteristic code, instruction characteristic code sequence, and class name function name characteristic code. In this case, the storing module 511 may comprise the following submodules:

an area-specific storing submodule configured to store the header information characteristic code, constant characteristic code, operand characteristic code, instruction characteristic code, instruction characteristic code sequence, class name function name characteristic code respectively in different storage areas of the database; or a tag storing submodule configured to store the header information characteristic code, constant characteristic code, operand characteristic code, instruction characteristic code, instruction characteristic code sequence, class name function name characteristic code in the database, and mark a classification tag respectively.

Since the device embodiment substantially corresponds to the previous method embodiments shown in FIG. 1, FIG. 2 and FIG. 3, reference may be made to the relevant depictions in the above method embodiments for details not depicted in the device embodiment.

Embodiments regarding parts in the present invention may be implemented in hardware, or implemented by software modules running on one or more processors, or implemented in their combinations. Those skilled in the art should understand that a microprocessor or digital signal processor (DSP) may be used in practice to implement some or all functions of some or all parts of the device for extracting a characteristic code of APK virus according to embodiments of the present invention. The present invention may also be implemented as an apparatus or apparatus program (e.g., computer program and computer program product) for executing part or all methods described here. Such programs implementing the present invention may be stored in a computer-readable medium, or may be in a form having one or more signals. Such signals can be obtained by downloading from the Internet, or provided on a carrier signal or provided in any other forms.

Figure 6:
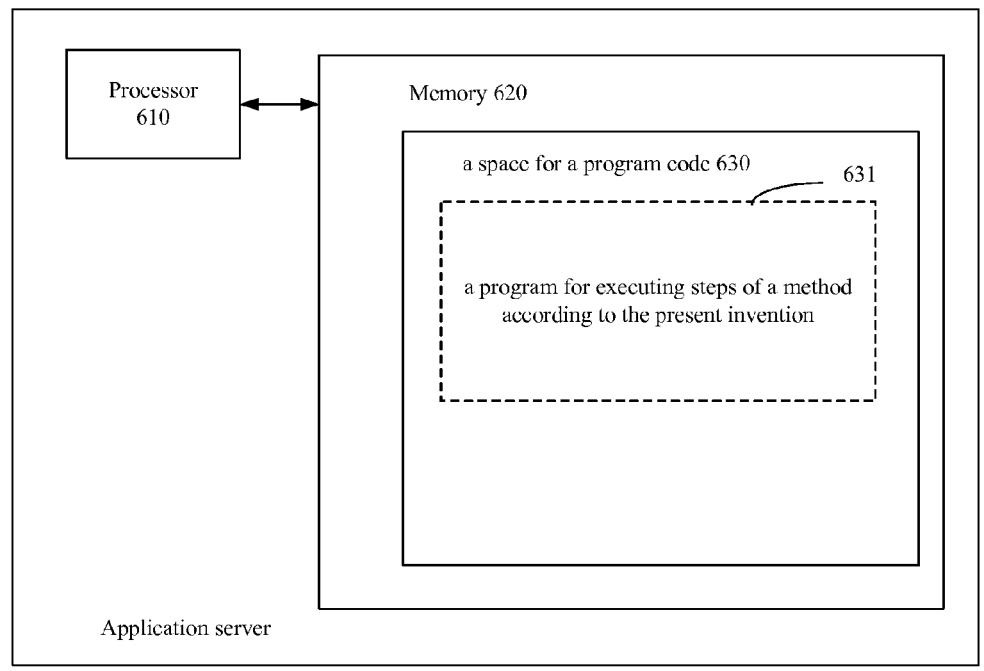
FIG. 6 illustrates a block diagram of a server for executing the method according to the present invention.
Figure 7:
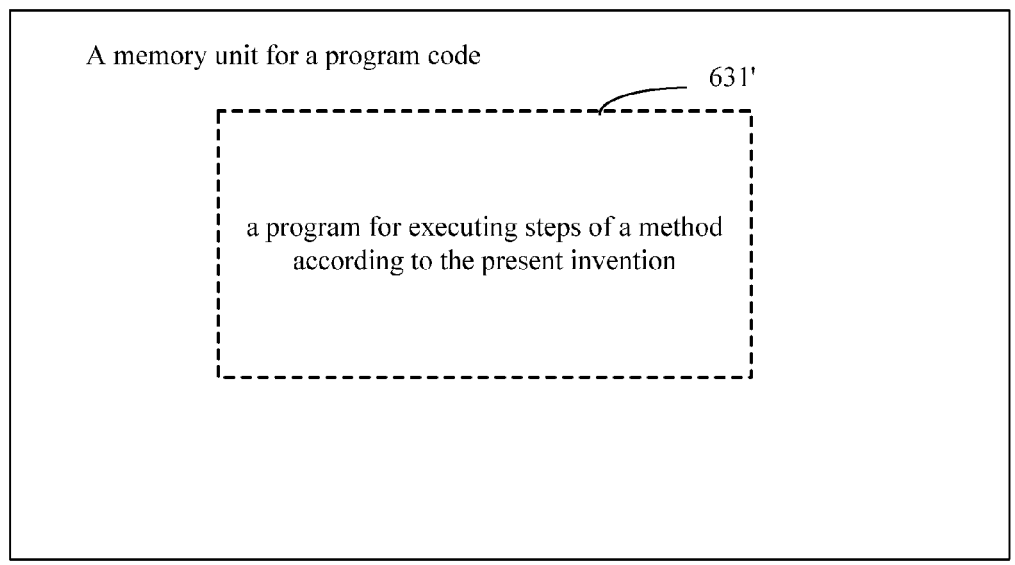
FIG. 7 illustrates a memory unit for maintaining or carrying a program code for implementing the method according to the present invention.

For example, FIG. 6 illustrates a server, for example, an application server, which can implement a method for extracting a characteristic code of APK virus according to the present invention. The server conventionally comprises a processor 610 and a computer program product or computer-readable medium in the form of a memory 620. The memory 620 may be a flash memory, EEPROM (Electrically Erasable Programmable Read-Only Memory), EPROM, hard disk or ROM-like electronic memory. The memory 620 has a storage space 630 for a program code 631 for executing any step of the above method. For example, the storage space 630 for the program code may comprise program codes 631 respectively for implementing steps of the above method. These program codes may be read from one or more computer program products or written into one or more computer program products. These computer program products comprise program code carriers such as hard disk, compact disk (CD), memory card or floppy disk. Such computer program products are usually portable or fixed memory units as shown in FIG. 7. The memory unit may have a storage section, a storage space or the like arranged in a similar way to the memory 620 in the server of FIG. 6. The program code may for example be compressed in a suitable form. Usually, the memory unit includes a computer-readable code 631', namely, a code readable by a processor for example similar to 610. When these codes are run by the server, the server is caused to execute steps of the method described above.

Reference herein to "one embodiment", "an embodiment", or to "one or more embodiments" means that a particular feature, structure, or characteristic described in connection with the embodiments is included in at least one embodiment of the invention. Further, it is noted that instances of the phrase "in one embodiment" herein are not necessarily all referring to the same embodiment.

The description as provided here describes a lot of specific details. However, it is appreciated that embodiments of the present invention may be implemented in the absence of these specific details. Some embodiments do not specify detail known methods, structures and technologies to make the description apparent.

It should be noted that the above embodiment illustrate the present invention but are not intended to limit the present invention, and those skilled in the art may design alternative embodiments without departing from the scope of the appended claims. In claims, any reference signs placed in parentheses should not be construed as limiting the claims. The word "comprising" does not exclude the presence of elements or steps not listed in a claim. The word "a" or "an" preceding an element does not exclude the presence of a plurality of such elements. The present invention may be implemented by virtue of hardware including several different elements and by virtue of a properly-programmed computer. In the device claims enumerating several units, several of these units can be embodied by one and the same item of hardware. The usage of the words first, second and third, et cetera, does not indicate any ordering. These words are to be interpreted as names.

In addition, it should be noted that the language used in the specification has been principally selected for readability and instructional purposes, and may not have been selected to delineate or circumscribe the inventive subject matter. Therefore, those having ordinary skill in the art appreciate that many modifications and variations without departing from the scope and spirit of the appended claims are obvious. The disclosure of the present invention is intended to be illustrative, but not limiting, of the scope of the invention, which is set forth in the claims.

What is claimed is:

1. A method for extracting a characteristic code of APK virus, comprising:

scanning a designated file in an Android installation package APK;

extracting an operation instruction in the designated file, and determining whether the operation instruction contains virus information; and generating a virus characteristic code according to the operation instruction when the operation instruction contains virus information;

wherein, the designated file comprises an executable file, and the method further comprises:

extracting a constant in a constant pool of the executable file, and determining whether the constant contains virus information;

generating the virus characteristic code according to the constant when the constant contains virus information;

extracting header information of the executable file, and determining whether the header information contains virus information; and generating the virus characteristic code according to the header information when the header information contains virus information, wherein the header information of the executable file includes summary information checksum and signature information Signature, and the determining whether the header information includes the virus information includes:

determining whether the summary information checksum and/or signature information Signature include a predefined illegal character string; and generating the virus characteristic code according to the header information comprises generating the summary information checksum and/or signature information Signature as the virus characteristic code.

2. The method according to claim 1, wherein the executable file comprises a Dex file, the Dex file comprises a classes.dex file, a file with an extension name .jar, and a file in Dex format.

3. The method according to claim 1, wherein the operation instruction comprises opcode and operand, and the determining whether the operation instruction contains virus information comprises:
determining whether the operand includes a pre-defined illegal operand;
and/or
determining whether the combination of the opcode and operand complies with a predefined illegal combination rule.

4. The method according to claim 3, wherein the generating the virus characteristic code according to the operation instruction comprises:
regarding the operation instruction itself as the virus characteristic code;
and/or
regarding the opcode of the operation instruction and a character string or wildcard of the operand as the virus characteristic code.

5. The method according to claim 1, wherein the constants in the constant pool in the executable file include constants in character strings, types, fields and methods, and the determining whether constants contain virus information comprises:
determining whether constants in the character strings contain pre-defined malicious web address information, malicious file names or malicious number information;
and/or
determining whether constants in the types, fields, and methods invoke a self-defined class name, a self-defined function name, an Android system SDK class name, or an Android system function name; and
generating the virus characteristic code according to the constant is regarding the virus information in the constant as the virus characteristic code.

6. The method according to claim 1, wherein the designated file further comprises a text file, and the operation instruction is a linux command,
the determining whether the operation instruction includes the virus information is determining whether the linux command complies with a preset malicious linux command; and
the generating the virus characteristic code according to the operation instruction is regarding the linux command as the virus characteristic code.

7. The method according to claim 1, wherein the method further comprises:
storing the virus characteristic code in a database.

8. The method according to claim 7, wherein the virus characteristic code comprises: header information characteristic code, constant characteristic code, operand characteristic code, instruction characteristic code, instruction characteristic code sequence, and class name function name characteristic code;
the storing the virus characteristic code in the database comprising:
storing the header information characteristic code, constant characteristic code, operand characteristic code, instruction characteristic code, instruction characteristic code sequence, and class name function name characteristic code respectively in different storage areas of the database; or
storing the header information characteristic code, constant characteristic code, operand characteristic code, instruction characteristic code, instruction characteristic code sequence, and class name function name characteristic code in the database, and marking a classification tag respectively.

9. A device for extracting a characteristic code of APK virus, comprising:
a memory having instructions stored thereon;
a processor to execute the instructions to perform operations for extracting a characteristic code of APK virus, the operations comprising:
scanning a designated file in an Android installation package APK;
extracting an operation instruction in the designated file;
determining whether the operation instruction contains virus information; and
generating a virus characteristic code according to the operation instruction if the operation instruction contains the virus information;
wherein, the designated file comprises an executable file, the operations further comprising:
extracting a constant in a constant pool of the executable file;
determining whether the constant includes virus information; and
generating the virus characteristic code according to the constant if the constant contains the virus information;
extracting header information in the executable file;
determining whether the header information includes virus information; and
generating the virus characteristic code according to the header information if the header information contains the virus information,
wherein the header information of the executable file includes summary information checksum and signature information Signature, and the determining whether the header information includes the virus information includes:
determining whether the summary information checksum and/or signature information Signature include a pre-defined illegal character string; and
generating the virus characteristic code according to the header information comprises generating the summary information checksum and/or signature information Signature as the virus characteristic code.

10. The device according to claim 9, wherein the executable file comprises a Dex file, the Dex file comprises a classes.dex file, a file with an extension name .jar, and a file in Dex format.

11. The device according to claim 9, wherein the operation instruction comprises opcode and operand, and the operation for determining whether the operation instruction contains virus information further comprises:
determining whether the operand includes a pre-defined illegal operand;
and/or
determining whether the combination of the opcode and operand complies with a predefined illegal combination rule.

12. The device according to claim 11, wherein the operation for generating the virus characteristic code according to the operation instruction further comprises:

regarding the operation instruction itself as the virus characteristic code;

and/or regarding the opcode of the operation instruction and a character string or wildcard of the operand as the virus characteristic code.

13. The device according to claim 9, wherein the constants in the constant pool in the executable file include constants in character strings, types, fields, and methods, and the operation for determining whether the constant includes virus information further comprises:

determining whether constants in the character strings contain pre-defined malicious web address information, malicious file names or malicious number information;

and/or determining whether constants in the types, fields, and methods invoke a self-defined class name, a self-defined function name, an Android system SDK class name, or an Android system function name.

14. The device according to claim 9, wherein the designated file further comprises a text file, and the operation instruction is a linux command, and the operation for determining whether the operation instruction contains virus information further comprises:

determining whether the linux command complies with a preset malicious linux command.

15. A non-transitory computer readable medium having instructions stored thereon that, when executed by a computing device cause the device to perform operations for extracting a characteristic code of APK virus, the operations comprising:

scanning a designated file in an Android installation package APK;

extracting an operation instruction in the designated file, and determining whether the operation instruction contains virus information; and generating a virus characteristic code according to the operation instruction when the operation instruction contains virus information;

wherein, the designated file comprises an executable file, the operations further comprising:

extracting a constant in a constant pool of the executable file, and determining whether the constant contains virus information;

generating the virus characteristic code according to the constant when the constant contains virus information;

extracting header information of the executable file, and determining whether the header information contains virus information; and generating the virus characteristic code according to the header information when the header information contains virus information, wherein the header information of the executable file includes summary information checksum and signature information Signature, and the determining whether the header information includes the virus information includes:

determining whether the summary information checksum and/or signature information Signature include a pre-defined illegal character string; and generating the virus characteristic code according to the header information comprises generating the summary information checksum and/or signature information Signature as the virus characteristic code.

* * * * *